United States Patent [19]

Oakes

[11] Patent Number: 5,049,010
[45] Date of Patent: Sep. 17, 1991

[54] METAL CUTTING TOOL
[75] Inventor: Harry C. Oakes, Perry, N.Y.
[73] Assignee: Unibit Corporation
[21] Appl. No.: 228,378
[22] Filed: Aug. 4, 1988
[51] Int. Cl.$^5$ ............................................. B23B 51/04
[52] U.S. Cl. ................................. 408/201; 408/67; 408/205; 408/209; 408/703
[58] Field of Search ............... 408/703, 204, 209, 207, 408/67, 68, 205, 208, 211, 212, 117–119; 125/20; 144/20, 21, 23

[56] References Cited

U.S. PATENT DOCUMENTS

| | | | |
|---|---|---|---|
| D. 282,369 | 1/1986 | de Villiers | D15/139 |
| 239,056 | 3/1881 | Overhiser | 408/204 |
| 248,033 | 10/1881 | Gazeley | 408/204 X |
| 468,085 | 2/1892 | Holcomb | 408/204 |
| 765,877 | 7/1904 | Brownstein . | |
| 1,310,319 | 7/1919 | Baumann | 408/703 |
| 1,593,654 | 7/1926 | Ermoshkin | 408/214 X |
| 2,869,405 | 1/1959 | Wolfe | 408/703 X |
| 3,430,526 | 3/1969 | Valenziano | 408/204 |
| 3,610,768 | 10/1971 | Cochran | 408/204 |
| 3,687,565 | 8/1972 | Byers et al. | 408/201 |
| 3,860,354 | 1/1975 | Hougen | 408/206 |
| 3,945,753 | 3/1976 | Byers et al. | 408/201 |
| 4,072,437 | 2/1978 | Smith et al. | 408/204 X |
| 4,147,464 | 4/1979 | Watson et al. | 408/703 X |
| 4,244,667 | 1/1981 | Timmons | 408/201 |
| 4,322,188 | 3/1982 | Hougen | 408/206 |
| 4,352,610 | 10/1982 | Yankovoy et al. | 408/206 X |
| 4,353,670 | 10/1982 | Jorgensen | 408/193 |
| 4,408,935 | 10/1983 | Miyanaga | 408/206 |
| 4,422,812 | 12/1983 | Linville | 408/204 |
| 4,490,080 | 12/1984 | Kezran | 408/703 X |
| 4,500,234 | 2/1985 | Orth et al. | 408/206 |
| 4,538,944 | 9/1985 | Hougen | 408/206 |
| 4,556,347 | 12/1985 | Barish | 408/230 |
| 4,573,838 | 3/1986 | Omi et al. | 408/204 |
| 4,591,303 | 5/1986 | Sato et al. | 408/206 |
| 4,625,707 | 12/1986 | Whittaker | 125/20 |
| 4,669,931 | 7/1987 | Isaksson | 408/206 |

FOREIGN PATENT DOCUMENTS

| | | | |
|---|---|---|---|
| 505530 | 8/1930 | Fed. Rep. of Germany | 144/20 |
| 593622 | 10/1947 | United Kingdom | 408/204 |

OTHER PUBLICATIONS

Advertisement for Carbide Tipped Hole Saws (Credo).
Advertisement for Jetbroach Cutters.

Primary Examiner—Z. R. Bilinsky
Assistant Examiner—Robert Schultz
Attorney, Agent, or Firm—Lackenbach, Siegel, Marzullo & Aronson

[57] ABSTRACT

A metal cutting tool is disclosed which includes a cylindrical cutting body (12) having an outer cylindrical surface (13) approximating the size of the hole desired and an inner wall (14) which tapers towards a base (15). The cutter body further includes a notch (17) for removal of cutting chips which has a socket disposed on the leading edge thereof. A carbide cutting tip (26) is disposed in the socket with the cutting tip being substantially pyramidically shaped, having a blunt cutting edge (35) extending above the cutter body. The metal cutting tool further includes a pilot bit (36) extending axially through the center of the cutter body, with the pilot including a short fluted (37) section which extends above the top of the cutting tip and provides a pilot hole for guiding the cutting tip during hole cutting. The metal cutting tool is extremely durable and is particularly suited for use with a hand held drill, providing a minimum of resistance during cutting, reducing tip binding or breakage and thereby providing smooth holes in sheet metal at field locations.

21 Claims, 1 Drawing Sheet

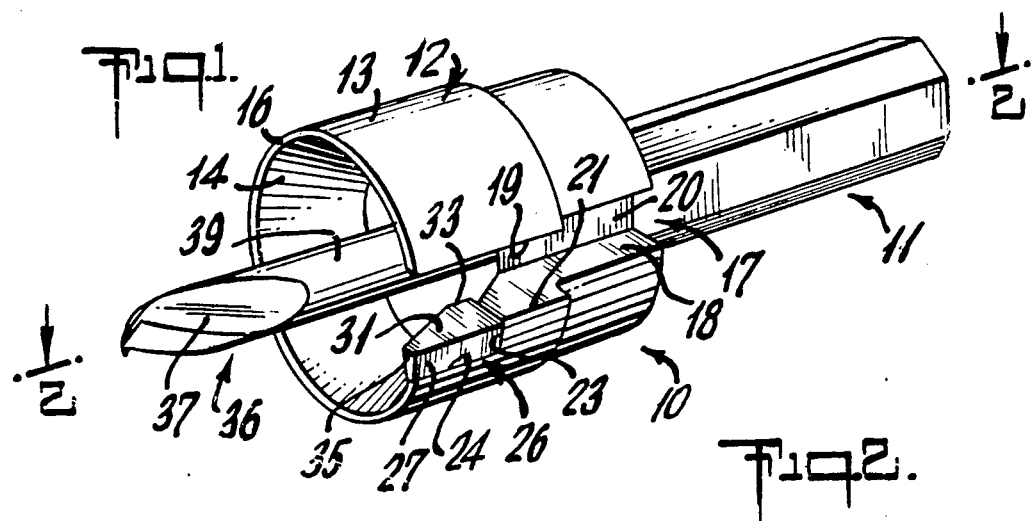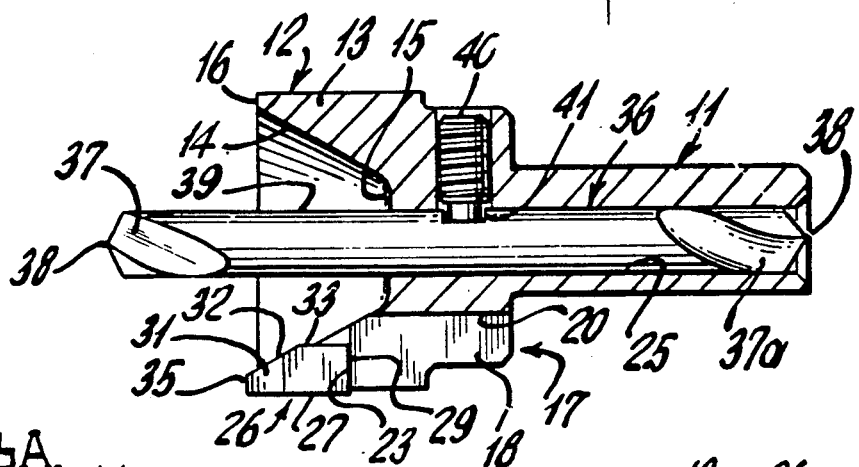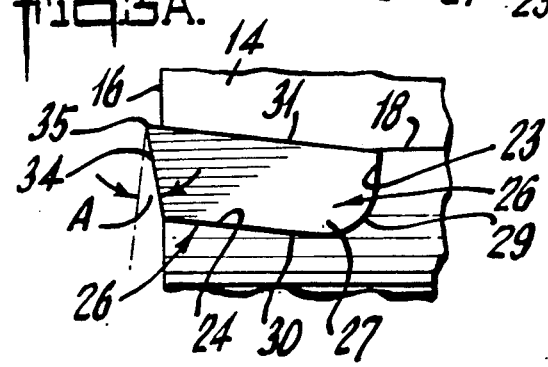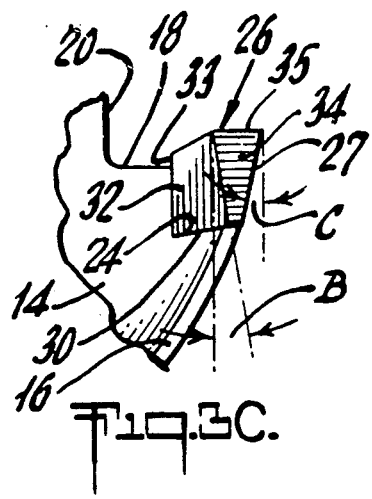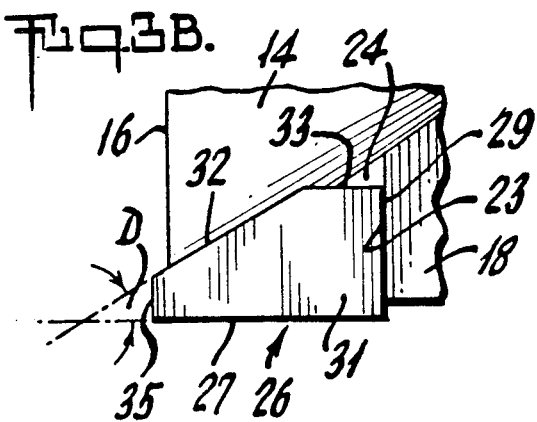

METAL CUTTING TOOL

TECHNICAL FIELD

This invention relates to metal cutting tools and more particularly to trepanning tools for cutting holes in sheet metal using a hand held drill.

BACKGROUND

Tools for cutting holes in various materials such as sheet metal generally fall into two types, those which operate by cutting or removing the entire interior area of a circle and those which operate by cutting only the circumferential area of a circle thereby producing an interior circular plug during the cutting operation. A conventional fluted drill is an example of the former type of tool. Such tools have the disadvantage of requiring substantially more cutting activity in order to produce the desired hole. Over a certain diameter, it is much more efficient and generally quicker to utilize a tool which cuts a thin circumferential circle for removing the metal as a plug. Such tools are generally known as trepanning tools. Tools of this type require substantially less cutting to achieve a desired hole and therefore provide large diameter holes quickly and with substantially less energy consumption.

The use of trepanning tools which cut only the circumferential area of circles to provide large diameter holes is widely known. Such tools generally comprise an elongated tubular cutting head having cutting blades or tips secured thereto which engage a work piece to shave or cut portions thereof to define the circumference of a circle upon rotation of the tool. Accordingly, as cutting of a work piece is effected, a center plug is produced which is received in the center area of the elongated tubular cutting head. Various ejector devices are commonly used with such tools to remove the plug from the tool, such as spring loaded arms. Tools of this type have been available for cutting holes having diameters ranging from approximately less than an inch to holes having extremely large diameters for example up to 10 inches or more. Such large diameter trepanning tools are generally associated with lathe type machines which are fixedly mounted for producing holes in an automated fashion. Generally, such trepanning tools are therefore rigidly aligned with the material to be cut which is usually also clamped or fixed to prevent movement. While such applications are well known in the art, there has been a continuing effort to produce tools suitable for use in a hand held fashion which will provide a relatively precise and smooth hole in thin sheet metal for use, for example, in field construction such as by an electrician in cutting holes in electrical boxes. In addition, it is desirable to cut holes in other types of sheet metal such as stainless steel, which is finding more use in home and building construction.

Various efforts have been made to produce trepanning tools which can be effective in cutting holes in sheet metal in diameters from approximately ½ inch up to 2 inches. However, such efforts have been generally unsatisfactory, as it is difficult to align hand held tools for producing smooth round holes. In addition to the loss of rigidity, hand held drills have torque and RPM limits considerably less than those available in a fixed machine structure. Consequently, a trepanning tool for hand held applications must produce holes with a minimum of resistance to preclude stalling or binding.

Most of the tools produced to date have suffered from rapid wear which requires frequent replacement of either the entire tool or of the cutting tips attached thereto. For example, in U.S. Pat. No. 4,490,080 to Kezran, there is disclosed a hole cutting tool which includes removable cutting tips. Kezran relies on means which retain the tips in slots comprising a retaining wedge which engages the leading edge of the slot and engages the leading edge of the tip to urge it against the trailing edge of the slot so that the cutting tip is wedged in position with the angle of the wedge and the angle of the trailing edge of the slot preventing outward movement of the tip. While such a trepanning tool may be effective in various applications, where field use is complicated it is difficult to provide for tip replacement as such tips are small and easily lost. Should a trepanning tool with dull tips be used, it would require additional torque and undergo accelerated wear, and produce a ragged hole due to binding of the tips in the sheet metal.

Generally, where multi-tip tools are used, wear may be uneven, causing binding to occur through misalignment of one or more tips within the hole Such binding is frustrating for the tool operator, and difficult to control with a hand held driving device, requiring additional manual force to overcome; Such a problem is additionally time consuming and often produces a ragged hole. Consequently, the search continues for a trepanning tool which is substantially wear resistant, and capable of producing smooth holes without binding in field applications using a hand held drill and to do so without requiring frequent replacement.

SUMMARY OF THE INVENTION

It is an object of the present invention to provide a trepanning tool which does not require a plurality of cutting tips to produce a hole in sheet metal.

It is a further object of the present invention to provide a trepanning tool which is capable of producing smooth holes in sheet metal in field locations using a common hand held drill.

It is another object of the present invention to provide a tool which is easily manufactured, producing a tool with substantially enhanced life at low cost.

It is another object of the present invention to provide a trepanning tool which cuts holes substantially faster than conventional tools, with a minimum of resistance, thereby reducing operator fatigue.

Accordingly, a metal cutting tool is disclosed which comprises a cylindrical cutter body which is substantially the diameter of the desired hole The cutter body includes an outer wall and an inner wall which tapers inwardly from a cutting end to a base in the cutter body, with the inner and outer walls joined at a forward edge thereof The cutter body includes a notch extending about the length thereof for removing cut material therefrom. A socket is disposed on one wall of the notch, with the socket sized to accept a cutting tip therein The body further includes an axially disposed bore extending therethrough for inclusion of pilot means which align the cutting tool with the desired hole location. The cutting tip is substantially pyramidically shaped and includes a blunt cutting edge which extends above the cutter body, further including a bottom and rear wall for mating with the socket in the cutter body.

BRIEF DESCRIPTION OF THE DRAWINGS

FIG. 1 is an enlarged perspective view of the metal cutting tool of the present invention.

FIG. 2 is a longitudinal cross-sectional view of the cutting tool of the present invention illustrating the location and placement of the cutting tip within the cutter body, taken along the line 2—2 of FIG. 1.

FIG. 3A is an enlarged partial front view showing the cutting tip, 3B, an enlarged side view, and 3C, an enlarged top view of the cutting tip located in the cutter body.

DETAILED DESCRIPTION OF THE INVENTION

Referring to FIGS. 1 and 2, the metal cutting tool of the present invention is shown. The tool 10 includes a drive engaging section 11, and a cutter body 12. The drive engaging section may be of any suitable shape for engaging a conventional drill chuck common, for example, to ⅜ or ½ inch drive drills.

The cutter body 12 includes an outer cylindrical surface 13, essentially matching the size of the hole desired, with the cutter body further including an inner, inwardly tapered surface 14 which joins at a base 15. The inner and outer surfaces join at a forward edge 16 of cutting body 12. Having an inwardly tapered surface allows plug discharge without requiring auxiliary plug removers such as spring loaded arms. Essentially, as a plug is cut, it tends to bow due to the cutting pressure, which forces the plug into the cutting body. After the plug is released from the sheet metal, it is driven by its own resiliency, acting on the tapered surface to self discharge, an important feature for field operation. Generally a taper of from 10-40 degrees may be used with about 27 degrees preferred in a ⅞ inch diameter tool.

The cutter body further includes a notch 17 extending from the forward edge 16 to the drive section 11 of the cutter body. The notch 17 is essentially rectangular, including sides 18 and 19, and a bottom 20. While a rectangular notch is shown, it will be understood that other shaped notches may also be used. The notch is preferably narrow, for example, on the order of about 0.25 inches wide in a ⅞ inch tool, to prevent hooking during hole cutting. A leading edge 21 of the side 18, in reference to the rotation of the tool, includes a socket 22 having a bottom wall 23 and a side wall 24, with the socket sized to accept a cutting tip therein The cutter body further includes a concentric bore 25 extending from the drive end through the base 15 of the cutter body.

Generally, the cutter body may be composed of steel, alloy or a high carbon steel known as "tool steel", and is preferably composed of A.I.S.I. 6150 steel, heat treated for maximum hardness and toughness.

The metal cutting tool includes a cutting tip 26 which is secured in the socket 22. Referring to FIGS. 3A-3C, the cutting tip 26 includes an outer wall 27 which is straight sided to essentially match the outer wall 13 of the cutter body 12. The tip outer wall 27 may optimally include a beveled outer leading edge for assuring that a smooth sided hole is provided during through cutting. The cutting tip further includes a bottom wall 29 and a rear wall 30 which mate with the bottom wall 23 and side wall 24 of the socket 22. In a preferred embodiment, best seen in FIG. 3A, the rear wall to bottom wall junction is curved rather than square edged in order to assure proper alignment and maximize distribution of the cutting forces over the surface of the cutter body. The bottom wall and rear wall should also be sized to provide a maximum surface area for bonding. For example, a bottom width of about 0.165 inches and a rear wall height of about 0.265 inches, joined with a radius of about 0.0625 inches, provides a large surface area for assuring firm bonding in a ⅞ inch diameter tool.

The cutting tip further includes a flat front face 31 which is generally in alignment with the side wall 18 of the notch 17. The carbide tip also includes an inwardly sloped wall 32, tapering towards the base 15 of the cutter body, which joins with a vertical section 33 forming an essentially pyramidically shaped tip. The wall 32 tapers essentially in about the same amount as the cutter body inner wall, i.e. about 10-40 degrees, with 30 degrees preferred (angle D). The carbide tip further includes a top flat surface 34 which slopes and tapers rearwardly in the direction of rotation. The top surface slope may be fairly steep, on the order of about 5-20 degrees, sloping rearwardly until the back of the top surface 34 is essentially flush with the forward edge 16 of the cutter body 12 (see FIG. 3A, angle A). For example, in a ⅞ inch tool, an 8 degree slope may be used. Similarly the taper may vary with tool size, being dependent on the desired clearance, with inner and outer tapers of 5-15 degrees possible (see FIG. 3B, angles B and C). Again, for a ⅞ inch tool, an inner taper of 10 degrees (B), and an outer taper of 12 degrees (C) are exemplary, with the difference in taper angle resulting from the difference in radius between the inner and outer walls.

A blunt cutting edge 35 is formed at the junction of the front face 31 with the top surface 34. The tip, at the cutting edge 35, extends above the forward edge of the cutter body, generally from 0.010 to 0.020 inches. For example, in a ⅞ inch tool for cutting sheet metal up to 0.14 inches thick, the tip extends about 0.015 inches above the forward edge of the cutter body. The cutting edge may be from 0.05 to 0.10 inches wide, with the top surface narrowing in the direction of rotation until it approximates the width of the cutter body forward edge, i.e. about 0.04 inches. The blunt cutting edge provided by this geometry is substantially more durable than the pointed cutting edges common to other tools which are prone to rapid wear or breakage. For the illustrative ⅞ inch tool, the cutting edge is preferably about 0.07 inches wide.

The cutting tip may be composed of tungsten carbide such as industry code number C-10, and is preferably composed of micro fine grain tungsten cobalt carbide. The cutting tip may be brazed, welded or otherwise bonded to the cutter body to assure that the tip does not move during cutting. Generally, brazing is preferred for bonding the tip to the cutter body, providing an economic yet reliable means of producing the metal cutting tool.

Referring to FIG. 2, the metal cutting tool of the present invention further includes a pilot drill bit 36 disposed within the bore 25 extending through the cutter body 12. Such a pilot bit includes a fluted section 37 which preferably has a double sided flute and a pointed end 38. A 135 degree split point is preferred to assure proper hole placement without requiring a prick punch mark. The pilot bit is a modified version of a common body drill used in the sheet metal trade, having no margin or clearance which is common to twist drills. Generally, if a common twist drill with standard fluted end were used, the side thrust generated by the trepanning tool cutting edge would cause the drill to cut on the side as an end mill, quickly producing an oversized egg shaped pilot hole which could allow the carbide tip to bind, producing a ragged hole. The pilot bit therefore includes a limited flute section to allow for first cutting a pilot hole using the fluted end and then insertion of an unfluted shaft section 39 within the pilot hole for guiding the cutting tip in the proper orbit without the side thrust causing hole enlargement.

The fluted section extends for at least the depth of the maximum gauge sheet metal for which the tool is designed, with about 0.25 inches generally adequate for most applications. The fluted section extends above the maximum height of the tip to allow the fluted end to disengage from the sheet metal prior to the tip contacting the sheet metal. In a preferred embodiment, shown in FIG. 2, the pilot is double ended, having a second fluted section 37a. The pilot may be removed by loosening a locking screw 40 which is engageable with a recess 41, allowing removal of the pilot and exchange of the dull end with a sharp end.

The metal cutting tool of the present invention is particularly suited for field use using a hand held driver such as a standard drill, being surprisingly durable and therefore capable of long term use. Utilizing a blunt cutting edge provides a smooth hole with a minimum of resistance, while substantially increasing wear resistance. In addition, limiting the metal cutting tool to a single tooth design prevents uneven wear, further reducing the potential for binding. Placing such a tip with a large bonding area in the cutting body previously described assures firm holding of the tip with a minimum of distortion, thereby reducing the chances for breakage. The shape of the cutter body also presents an outside body surface which rubs in the cut such that any misalignment caused by the lack of rigidity in the hand held operation causes a reverse thrust to return the tool to the proper orbit. Utilizing a narrow notch prevents the notch from hooking when the hand held drill is tipped at an angle to the hole axis, allowing intersecting holes to be drilled without binding, so long as a pilot hole can be provided. The tapered inner wall of the cutter body also provides near automatic discharge of the cut plug without requiring auxiliary devices.

While the preferred embodiment of the present invention has been described in relation to a metal cutting tool including a rectangular notch and a particularly shaped cutting tip extending from a cutter body, it will be understood by those skilled in the art that other similarly shaped cutting tips, notches or pilot bits can be used without varying from the scope of the present invention. In addition, it will be understood by those skilled in the art that the means for attaching to a drive member such as a hand held drill may vary in accordance with the various drill chucks common to the art.

I claim:

1. A metal cutting tool for trepanning holes in a sheet metal, said cutting tool comprising
    a cutter body extending from a first front end to a second rear end and having a substantially cylindrical outer wall substantially matching the diameter of a hole to be produced, a base disposed within the cutter body, an inner wall tapering radially inwardly from the first front end to the base, said inner wall joining said outer wall of the body to form a forward edge at said first front end, said cutter body having a notch extending for substantially the length of the body from said first end to said second end for removal of cut material and defined by at least side walls thereof, a socket disposed within one said side wall of the notch at the first front end of the cutter body, said socket being adapted to accept a cutting tip therein;
    said cutting tip secured to the body and having at least an outer wall, an inner wall, a top surface, a rear wall, a bottom wall and a front face, said front face and said top surface join to form a cutting edge extending forwardly of the cutter body;
    said top surface sloping from said cutting edge in the front to back direction relative to the direction of rotation of said cutting tool, at least a part of said inner wall of the cutting tip slopes from the top cutting surface towards the base, said front face of the tip slopes from said cutting edge to said side wall of the notch, the cutting tip extending above the forward edge of the cutter body by at least 0.005 inches at the cutting edge;
    an axial bore extending through the cutter body, pilot means disposed within said axial bore and permanently secured to said body, said pilot means being adapted for aligning the tool at the desired hole location; and a shank extending from said cutter body for releasable engagement with the drill.

2. The metal cutting tool of claim 1 wherein the notch is essentially rectangular in shape.

3. The metal cutting tool of claim 1 wherein the socket includes a bottom wall and a side wall which are sized to accept the cutting tip therein.

4. The metal cutting tool of claim 1 wherein the cutter body is composed of steel.

5. The metal cutting tool of claim 4 wherein the cutter body is composed of tool steel, heat-treated for hardness and toughness.

6. The metal cutting tool of claim 1 wherein the cutting edge is from 0.050 to 0.010 inches wide.

7. The metal cutting tool of claim 1 wherein the cutting tip top cutting surface tapers from front to rear from about 5–15 degree relative to the cutter body.

8. The metal cutting tool of claim 7 wherein the top cutting surface slopes from front to rear at about 8 degrees.

9. The metal cutting tool of claim 1 wherein the cutting tip is composed of tungsten carbide.

10. The metal cutting tool of claim 1 wherein the cutting tip is composed of micro-fine grain tungsten cobalt carbide.

11. The metal cutting tool of claim 1 wherein the pilot means comprise a pilot bit including a fluted section for drilling a pilot hole, the fluted section provided above the height of the cutting tip, the pilot bit including a cylindrical shaft section from which the fluted section extends, wherein a pilot hole is provided by the fluted section with the cylindrical shaft section entering the pilot hole prior to the cutting tip contacting the sheet metal.

12. The metal cutting tool of claim 11 wherein the pilot bit includes a 135 degree split point for providing a pilot hole without requiring a prick punch.

13. The metal cutting tool of claim 12 wherein the pilot bit includes limited fluted sections at opposite ends thereof, the bit including locking means for holding within the cutter body bore, the locking means symmetrical therewith in order to allow removal of the pilot bit and switching of the fluted ends after one end becomes dull.

14. The cutting tool according to claim 1, wherein said entire cutting edge is substantially radially oriented on the tool and lies substantially in a plane at right angles to a rotational axis of the tool.

15. The cutting tool according to claim 1, wherein said notch having a form of a channel defined by two said side walls and a main wall at least partially connecting said two side walls, said two side walls being substantially parallel to each other along the entire length thereof, said notch enabling the cutting tool to at least partially remove cut material from the drilled hole during operation of the tool and without removal of the tool from the hole.

16. The cutting tool according to claim 15, wherein said main wall of the notch is substantially perpendicular to the side walls and a longitudinal axis of each side wall is substantially parallel to an axis rotation of the tool.

17. The cuting tool according to claim 1, wherein said outer wall of the tip is flush with said substantially cylindrical outer wall of the cutter body, at least one end of said front face of the tip is in alignment with the side wall of the notch.

18. The cutting tool according to claim 1, wherein said rear wall of the cutting tip is substantially parallel to the front face thereof.

19. The cutting tool according to claim 15, wherein said inner wall and said base of the cutter body define an internal space, said notch connecting said internal space with said second rear end of the cutter body.

20. A metal cutting tool according to claim 1, wherein said cutting tool is adapted to be used with a hand-held drill as a driving device.

21. The metal cutting tool of claim 19 wherein the pilot means comprise a pilot bit, including a fluted end for drilling a pilot hole, the fluted end extending above the height of the tip, the pilot bit including a cylindrical shaft section which enters the pilot hole prior to the tip contacting the sheet metal, the pilot bit thereby guiding the tip for assuring that an essentially smooth round hole is formed.

* * * * *